United States Patent

Giesken

[15] 3,637,945

[45] Jan. 25, 1972

[54] SWITCHING NETWORK PATH RESERVATION ARRANGEMENT

[72] Inventor: Kenneth F. Giesken, Westerville, Ohio

[73] Assignee: Bell Telephone Laboratories, Incorporated, Murray Hill, Berkeley Heights, N.J.

[22] Filed: Nov. 26, 1969

[21] Appl. No.: 879,995

[52] U.S. Cl. ................................................ 179/18 E, 179/22
[51] Int. Cl. ........................................................ H04q 3/495
[58] Field of Search ................................ 179/18 FF, 22, 18 E

[56] References Cited

UNITED STATES PATENTS 3,127,480 3/1964 Ek et al. .................................. 179/22
2,882,343 4/1959 Gohorel .............................. 179/18 E

*Primary Examiner*—Kathleen H. Claffy
*Assistant Examiner*—Thomas W. Brown
*Attorney*—R. J. Guenther and James Warren Falk

[57] ABSTRACT

A switching system is arranged with control circuitry operative to identify a switching network link which will be required for a subsequent linkage path and to attempt to use the identified link as part of a preliminary linkage path and, in the alternative, to partially enable this link and thus render it "-busy" simultaneously with the enabling of the preliminary linkage path. The arrangement thus insures the later availability of the identified link for use in the subsequent linkage path.

11 Claims, 11 Drawing Figures

INVENTOR
K. F. GIESKEN
BY

ATTORNEY

SWITCHING NETWORK PATH RESERVATION ARRANGEMENT

BACKGROUND OF THE INVENTION

1. Field of the Invention

This invention relates generally to switching systems comprising a plurality of network stages having related linkage paths. More particularly, this invention relates to switching systems arranged to identify and to reserve network linkage paths for subsequent use.

2. Description of the Prior Art

It is well known in switching system network arrangements that related switching stages are interconnected by linkage paths which are distributed between stages. It is a basic design criteria of these networks that such paths be provided in sufficient quantity to ensure access between the respective network input and output terminals. However, for reasons of economy it is also desirable that switching networks not be equipped with links beyond that absolutely required to insure access. Accordingly, it is often desirable to provide only a single link between particular units of respective switching stages. For example, in a crossbar switching network frequently only one common link is provided between crossbar switches in succeeding switching stages. Obviously, each such linkage path is available to serve any one of a plurality of terminals on associated switches at either stage. The result of this arrangement is an efficient and economical switching network.

However, instances arise where a particular terminal point (such as that directly serving a trunk circuit or line circuit) will subsequently require connection to a specific linkage path in order to satisfactorily function within the switching system. Obviously, no problem prevails where the particular linkage path is available at the time it is required. However, in view of the availability of each link to serve a multiplicity of other terminal points, such systems are often rendered less efficient when a required link is found to be unavailable when subsequently required.

Accordingly, a need exists in the art for an arrangement which is operable to identify a switching network linkage path which is required for subsequent use and to insure its availability at that time.

SUMMARY OF THE INVENTION

In the embodiment, an automatic switching system is described which includes a six stage switching network. The first stage provides terminations for the various line circuits which serve the respective telephone stations. The next succeeding three stages constitute the principal expansion and concentration stages of the network. The fifth stage serves as an expansion stage and also terminates service circuits connectable to various calling trunks. The sixth stage provides terminations for the various trunk circuits and service circuits ultimately connectable through the network to the line circuits in the first stage.

For a typical incoming call, an incoming trunk in the sixth stage may be connected via a linkage path to an audible ringing tone circuit in the fifth stage, while concurrently a ringing circuit in the sixth stage is connected via a linkage path extending through the entire network to a called line circuit. Since the latter linkage path will subsequently be utilized in part for the talking path, all that is required to subsequently ensure completion of the talking path is a single link extending from the fifth stage to the incoming trunk appearance on the sixth stage. Control circuitry is provided operable to identify this subsequently required link at the time the initial, or preliminary, linkage paths are established. The control circuitry is arranged to attempt to include the predetermined link as a part of the preliminary linkage path and is also operative, in the alternative, to partially enable this link and thus to render it "busy" simultaneously with the enabling of the preliminary linkage path. Upon answer by the called station, the initially selected linkage paths are released, thereby rendering the entire voice linkage path available for immediate reselection. Thus, by initially identifying a subsequently required linkage path and immediately rendering it temporarily unavailable either by actual use or by an artificial busy condition, its subsequent availability when required is assured.

In accordance with one feature of my invention, a switching system is arranged, during the course of establishing a preliminary network connection, to identify a linkage path which will be subsequently required to complete a final connection and to ensure the availability of the identified link for use in the final connection.

In accordance with another feature of my invention, a switching system is arranged to ensure the availability of a subsequently required linkage path by rendering such linkage path unavailable only during the period it is subject to selection and use by other connections in the process of being established.

It is another feature of my invention that the foregoing features are accomplished by control circuitry which is operative to render such linkage path unavailable by first attempting to utilize such path as a necessary part of the preliminary network connection and, in the alternative, to introduce an artificial busy condition of the required linkage path which is effective only during the enabled state of the preliminary connection.

BRIEF DESCRIPTION OF THE DRAWING

The foregoing and other objects, features and advantages of the invention will be more apparent from the following description of the drawing in which.

Figure 4:
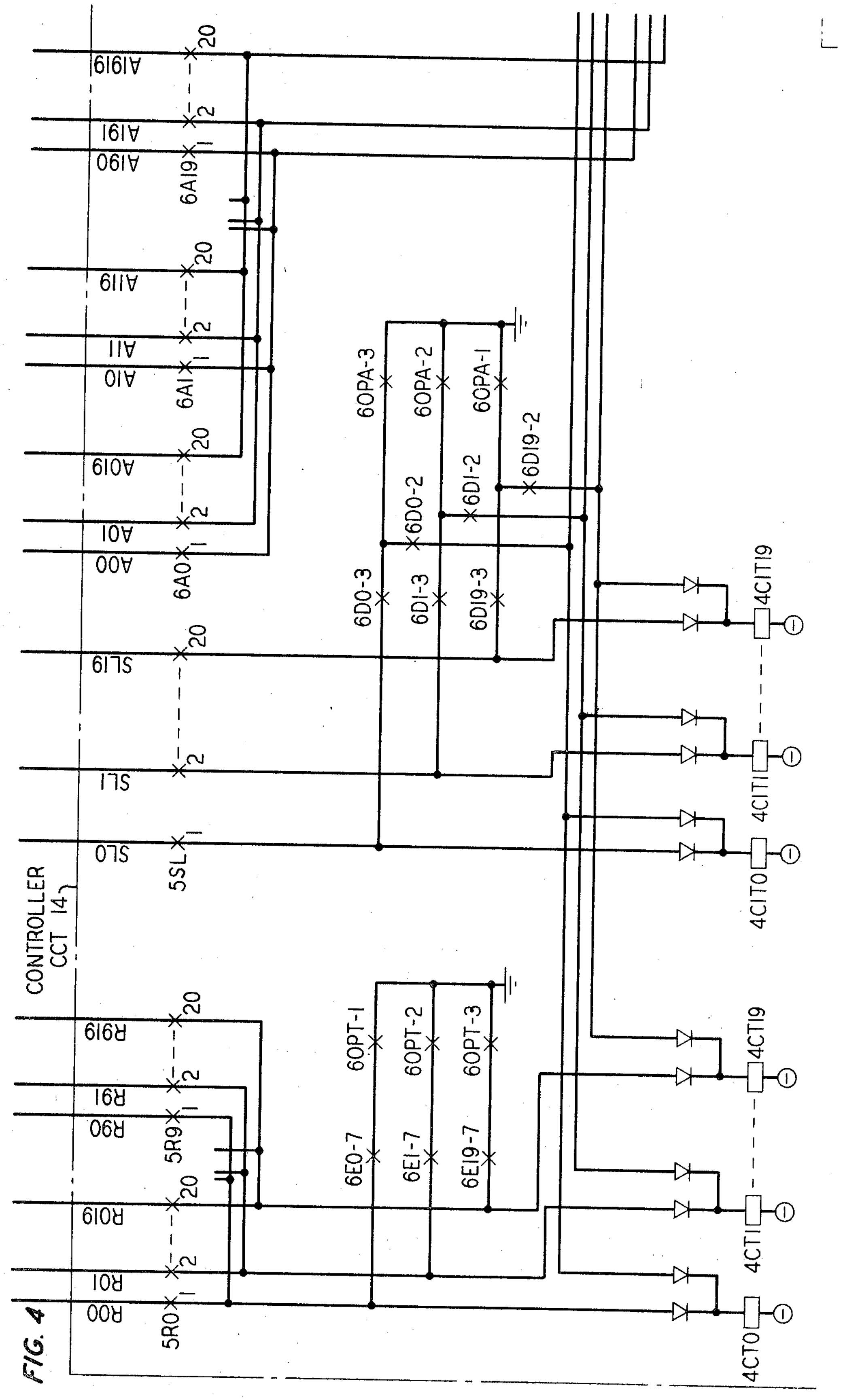
FIGS. 4 through 6 are schematic drawings showing in detail the switching network control circuitry of the exemplary embodiment.
Figure 5:
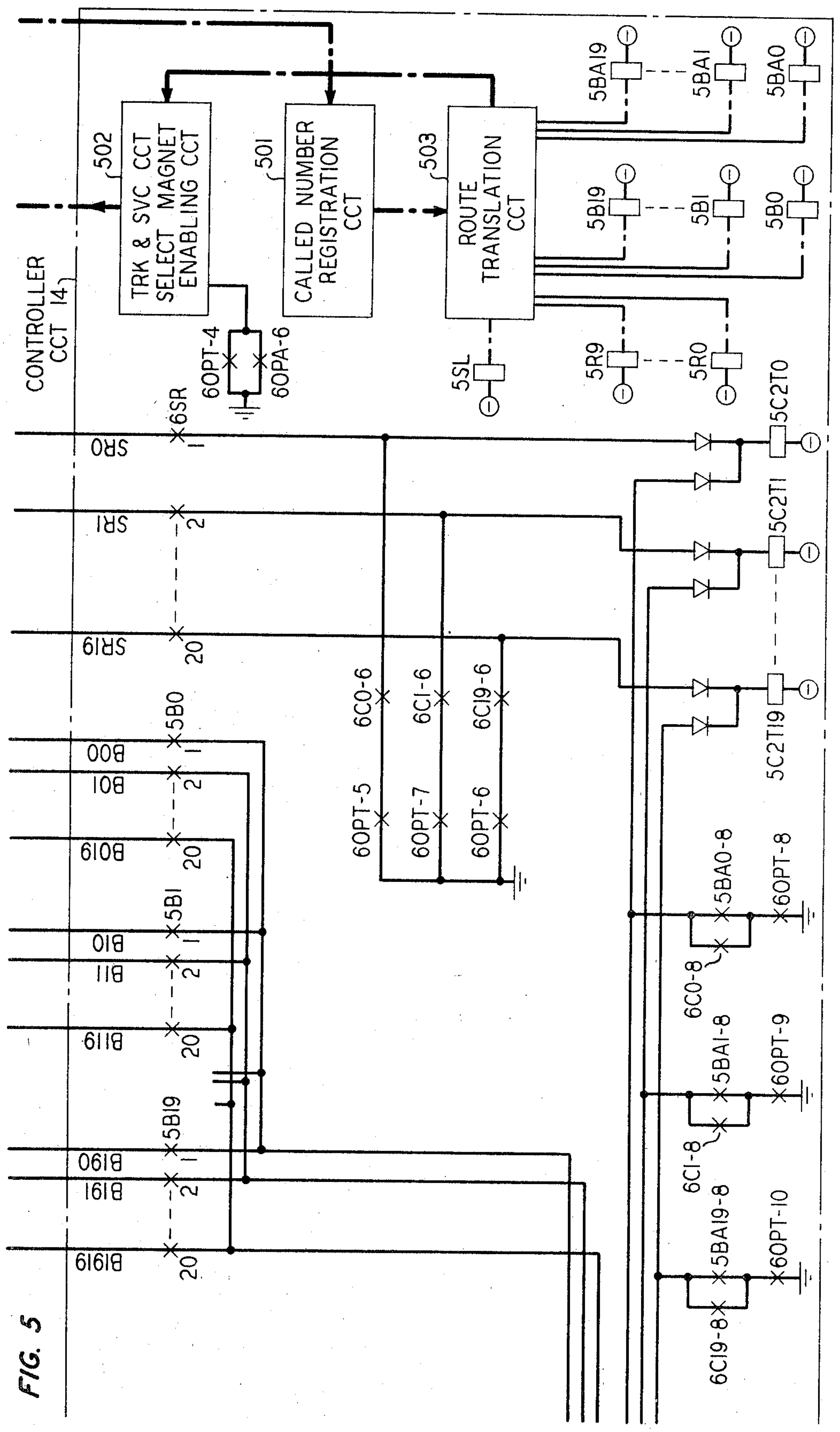
Figure 6:
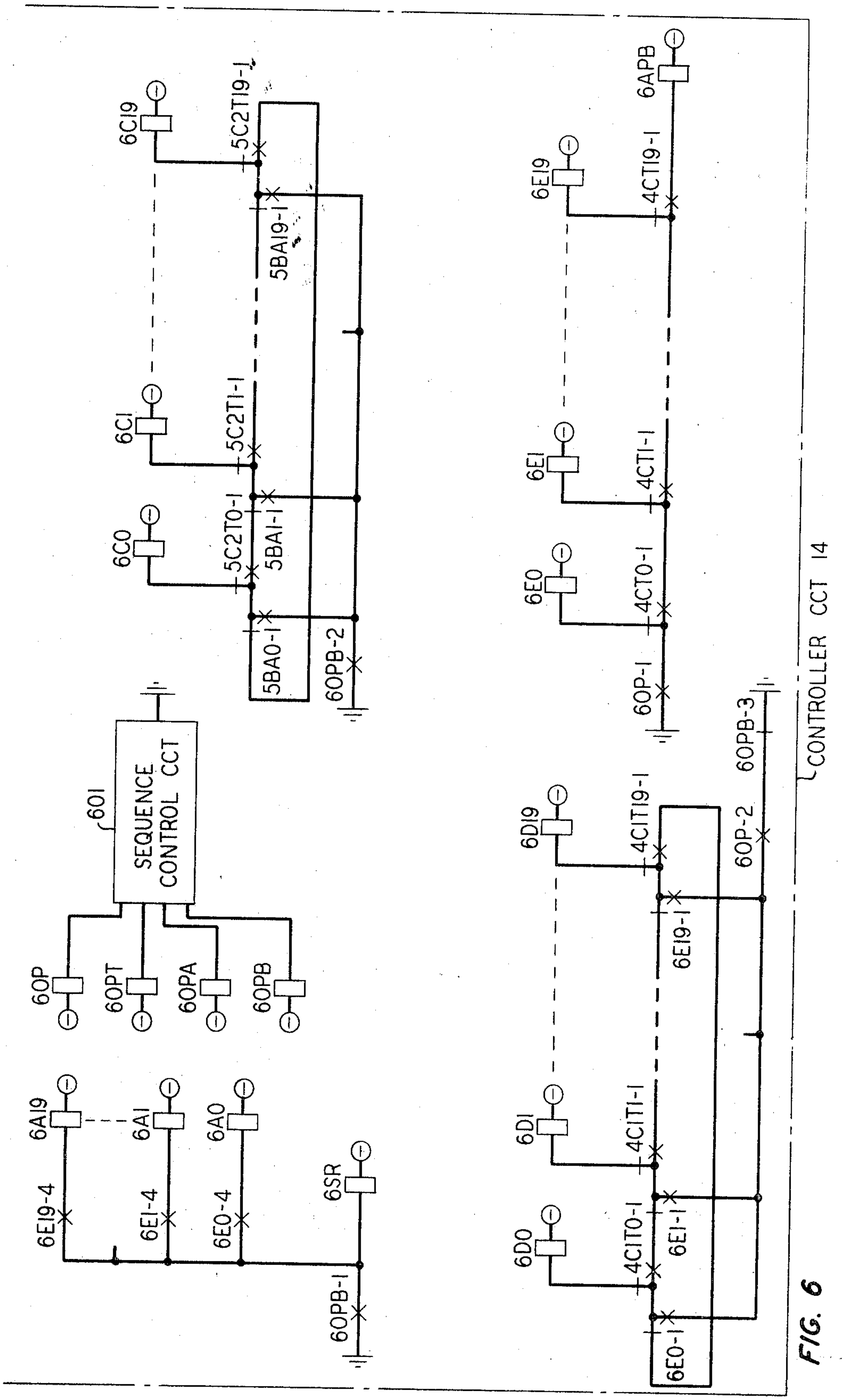

It will be noted that FIGS. 4 through 6 employ a type of notation referred to as "detached contact" in which an X represents a normally open contact of a relay, and a bar, shown intersecting a conductor at right angles, represents a normally closed contact of a relay; "normally" referring to the unoperated condition of the relay. The principles of this type or notation are described in an article entitled "An Improved Detached-Contact-Type Schematic Circuit Drawing" by F. T. Meyer in the Sept. 1955 publication of the *American Institute of Electrical Engineers Transactions, Communications and Electronics*, Vol. 74, pp. 505–513.

The present invention may be advantageously incorporated in an automatic telephone system wherein common control circuits are employed to control the establishment of calls through a switching network. One such system is disclosed in the A. J. Busch U.S. Pat. No. 2,585,904, issued Feb. 19, 1952. It is to be understood, however, that the present invention is not limited to use in a telephone system of this type but may be utilized in other types of switching systems.

The invention is described herein as being embodied in a telephone system of the type disclosed in the cited Busch patent. The invention is particularly concerned with apparatus in extended network 12 and controller circuit 14. The other components of the embodiment, such as those shown within switching system 9 are neither disclosed nor described herein in detail except where necessary for a complete understanding of the invention. Where more detailed information is desired, the earlier cited Busch patent may be consulted.

GENERAL DESCRIPTION

The interrelationship and function of the equipment units of the exemplary embodiment will now be described generally with reference to FIGS. 1 through 6, wherein the interconnection of circuit blocks has been designated by arrows to show the direction of circuit action.

For purpose of the embodiment we shall assume that it is desirable to expand the switching network capacity of switching system 9. As set forth in detail in the Busch patent and as well known in the art, switching system 9 consists of a first and a second stage or crossbar switches on each line link frame (such as line link frame 1) which are connected with each other by line links and which frame is connected via junctors to the various trunk link frames such as trunk link frames 5 and 6. Each trunk link frame consists of a third and fourth stage or crossbar switches which are also interconnected via links designated trunk links. In a conventional system of the typed cited in the aforesaid Busch patent the aforesaid four stages provide the switching network for interconnecting telephone stations such as telephone station S8 which is terminated on line link frame 1 and various calling and called trunk circuits (not shown) which are terminated on the various trunk line frames within the switching system as well known in the art. Marker and other common control circuits 7 contains the control apparatus for establishing and enabling the network connections between such stations and the respective trunks.

It is well known in the art that switching network capacity is increased by providing more network. For example, the system disclosed in the cited Busch patent may be expanded to a 60 line link frame-30 trunk link frame size by providing extension trunk link frames. To expand the network beyond the 60–30 size would require another tier of extensions on all trunk link frames. An alternative, as will be apparent from that which is contained hereinafter, is to build "modules" of line link-trunk link networks as exemplified by switching system 9 in FIG. 1, in sizes no larger than 20–10. Additional network is provided by adding switches in tandem which are nearly equivalent in number to the extension switches required for a tripled-extension frame office size, thus providing distribution to a multitude of line link-trunk link modules equivalent to switching system 9. As is well known in the art, network switches so arranged in tandem provide more distribution capability than network switches in parallel. Thus maximum network capacity is assured.

As assumed for the purpose of the instant embodiment, the switching network capacity of switching system 9 has been increased by the provision of two additional stages of switching, namely: a fifth and a sixth stage respectively designated primary switches and secondary switches in extended network 12. In view of the addition of these two stages of switching, the various trunks normally terminated directly on the trunk link frame of switching system 9 are now terminated on the horizontal levels of the secondary switches in extended network 12. It will thus be obvious that a call from an incoming trunk, such as incoming trunk 15, to a station, such as station S8, will extend through one of the secondary switches and one of the primary switches in extended network 12, via a link extending to one of the trunk line frames in switching system 9, via a junctor to a particular line link frame and thence to the called station.

As well known in the art, the particular number of line link frames and the particular number of trunk link frames which are provided within a particular control office will vary depending upon traffic considerations at a given location. For purpose of simplicity, we have assumed that switching system 9 comprises one module of line link frames and trunk link frames within such an office and further that this module consists of four line link frames and two trunk link frames. As will be apparent from that which is contained hereinafter, the output terminals of the trunk line frames will be distributed over the various switches in the primary switching stage of the added network stages such as extended network 12 in a predetermined manner effective to provide maximum access between the stages. Cables C10 and C11 symbolically represent this distribution for the instant embodiment.

Figures 1, 7:
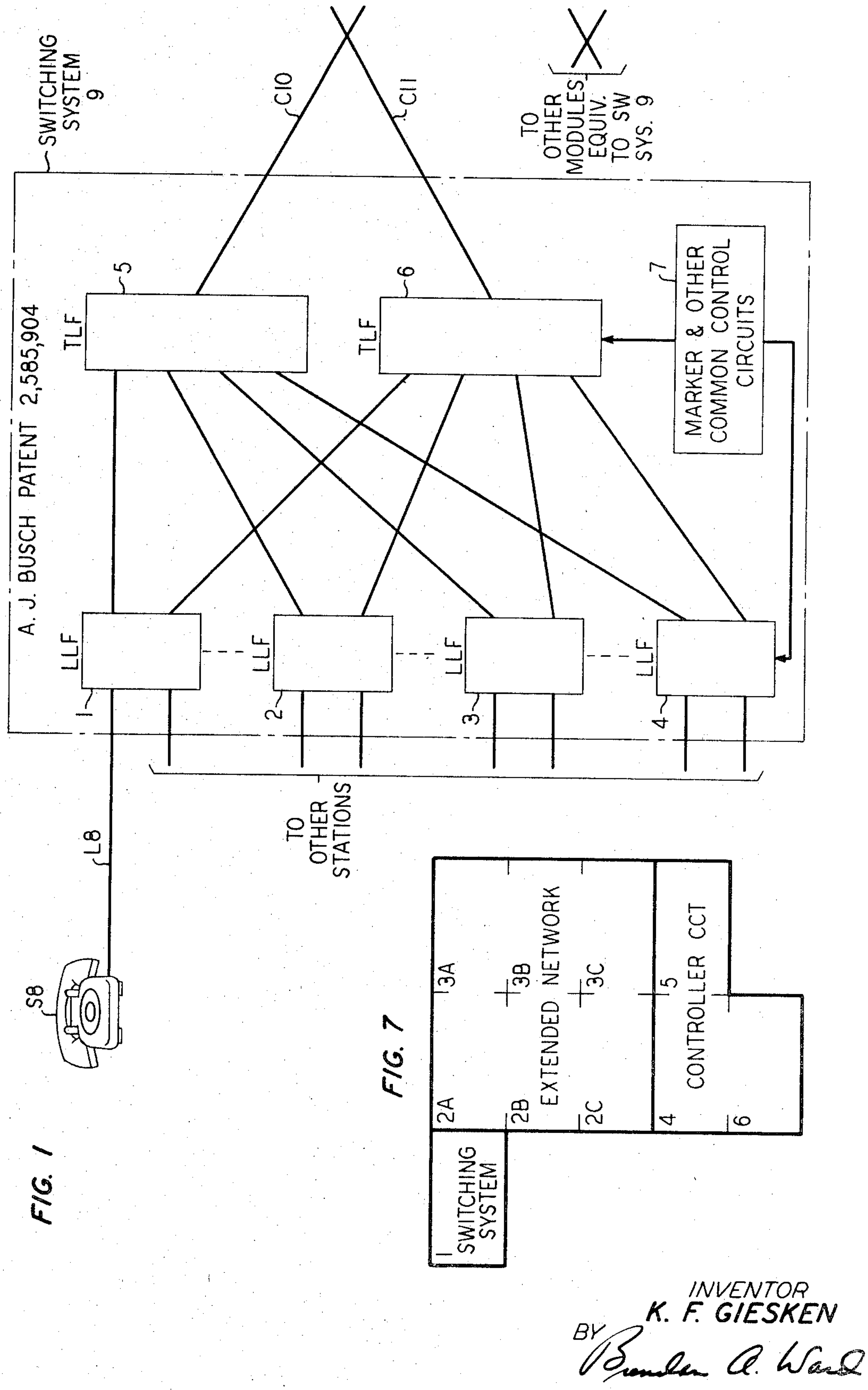
FIGS. 1, 2A, 2B, 2C and 3A, 3B and 3C are essentially block diagrams showing the switching network of the exemplary embodiment of the invention.
FIG. 7 shows the manner in which the other figures should be arranged.
Figure 2A:
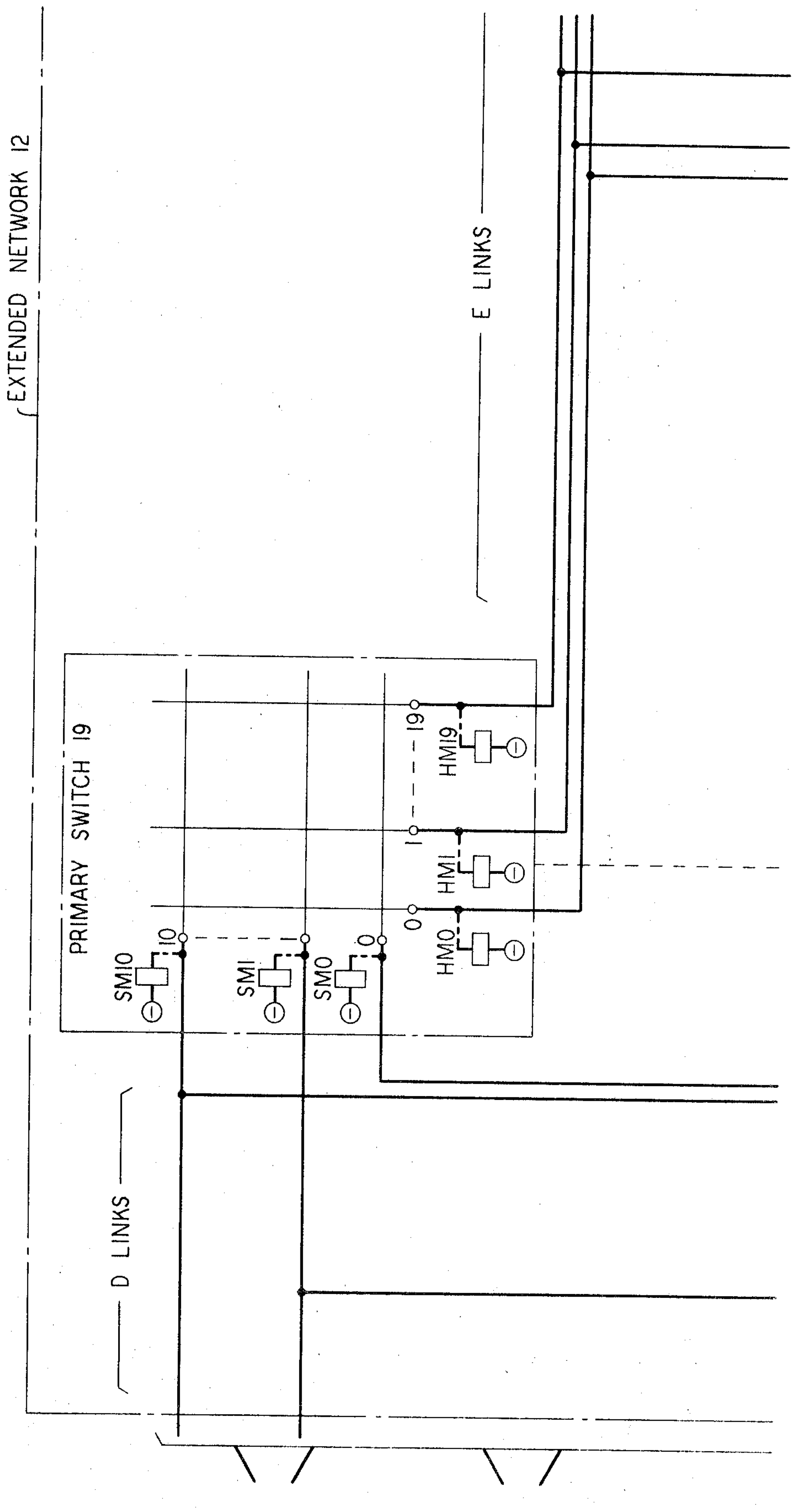
Figure 2B:
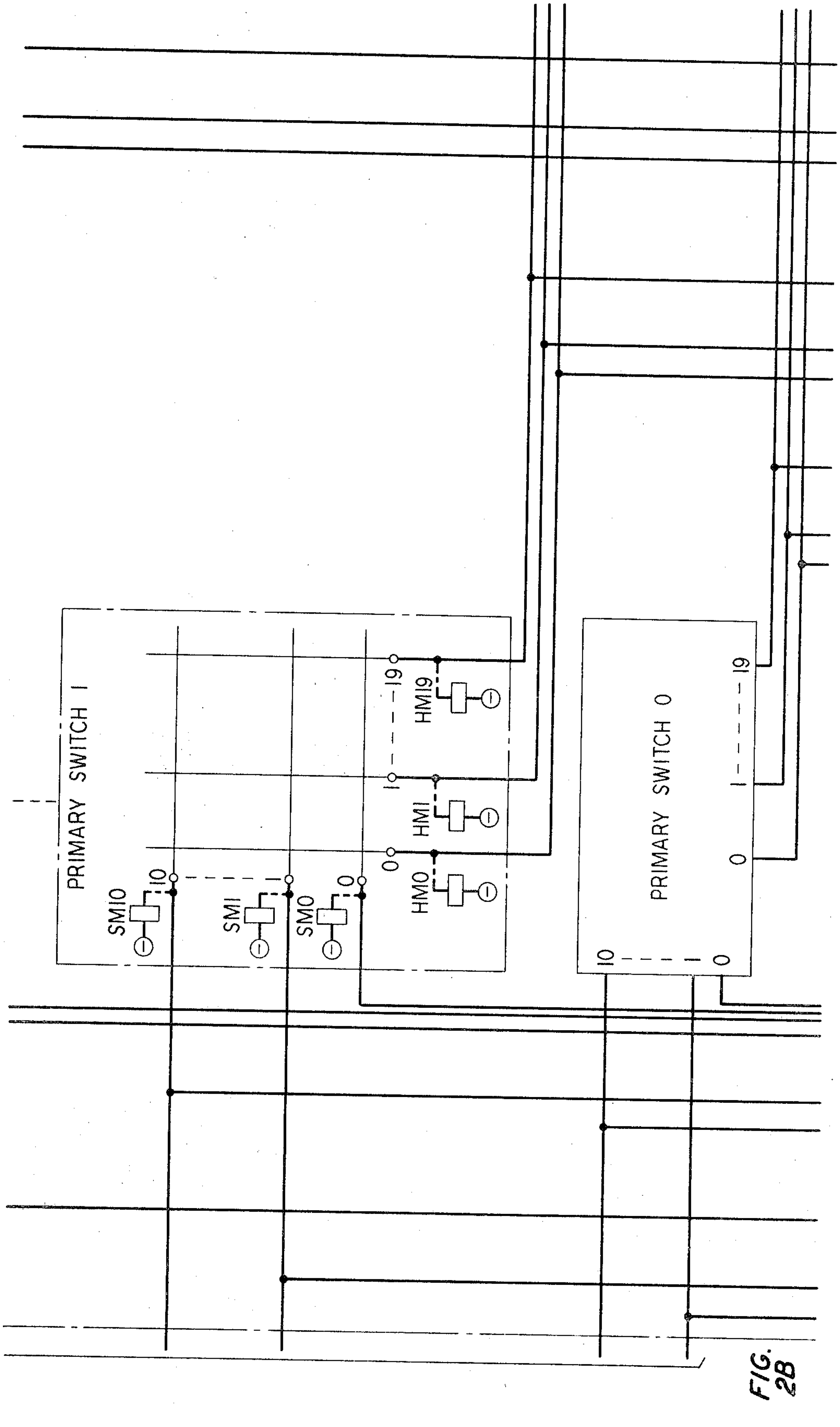
Figure 2C:
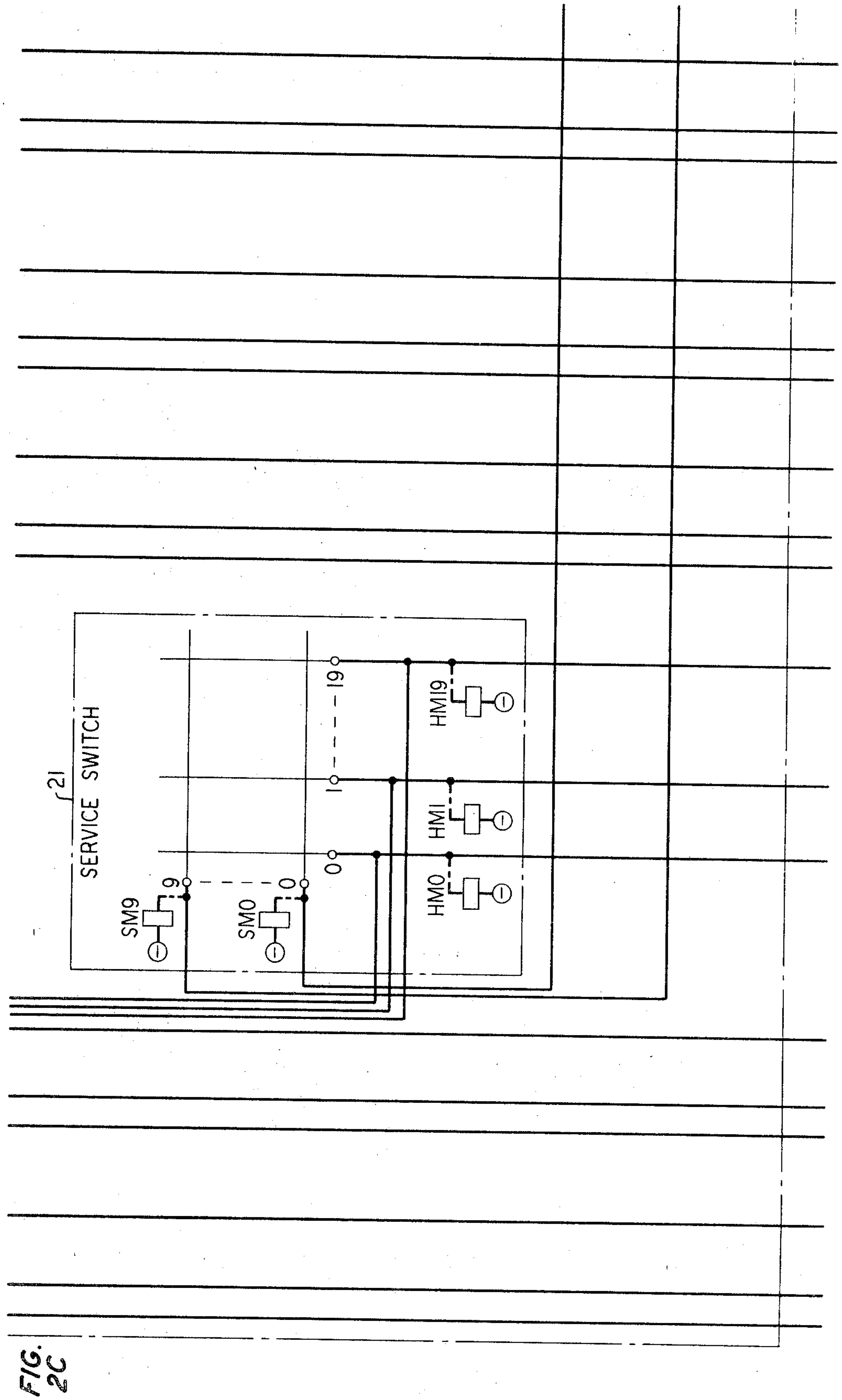
Figure 3A:
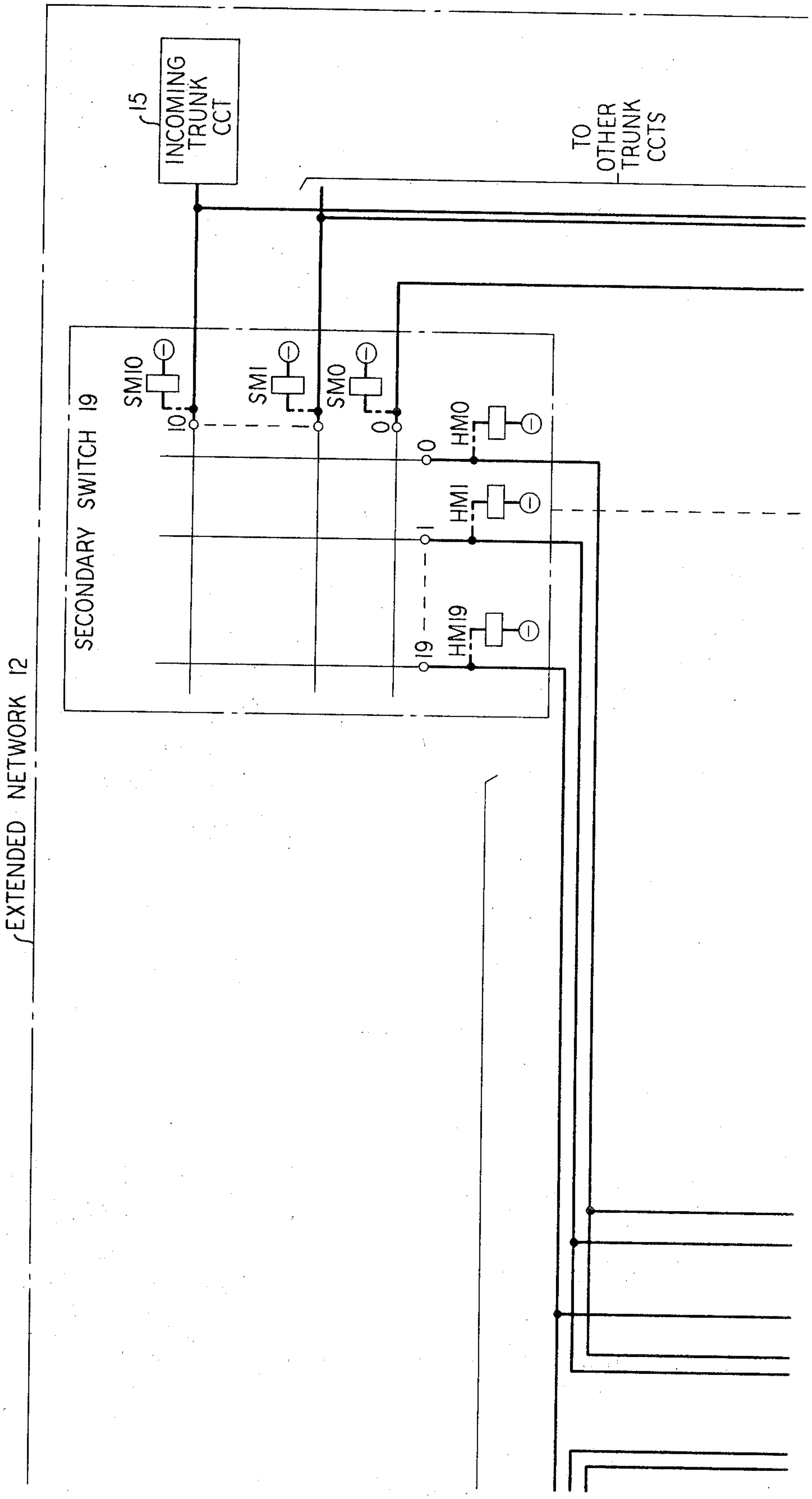
Figure 3B:
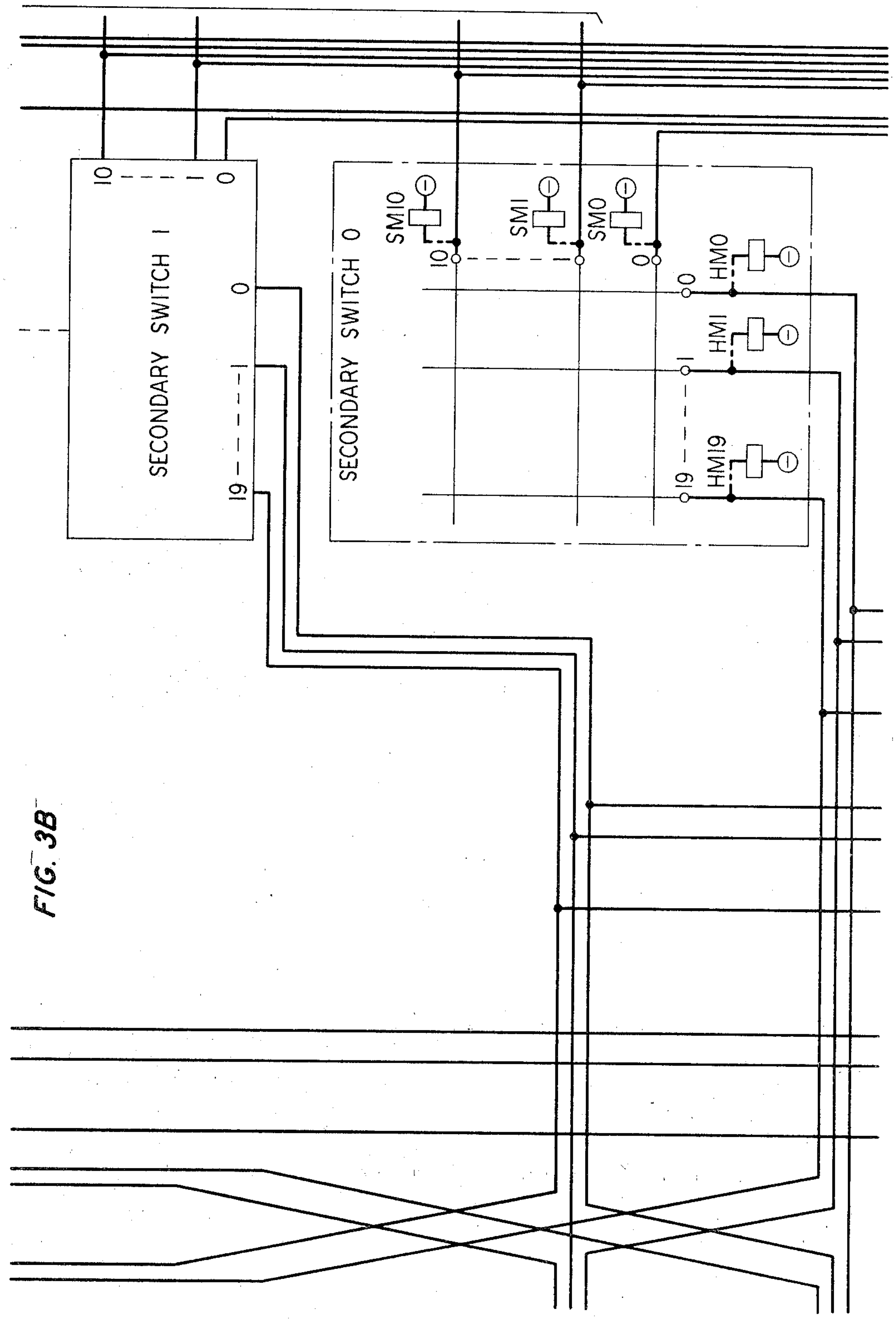
Figure 3C:
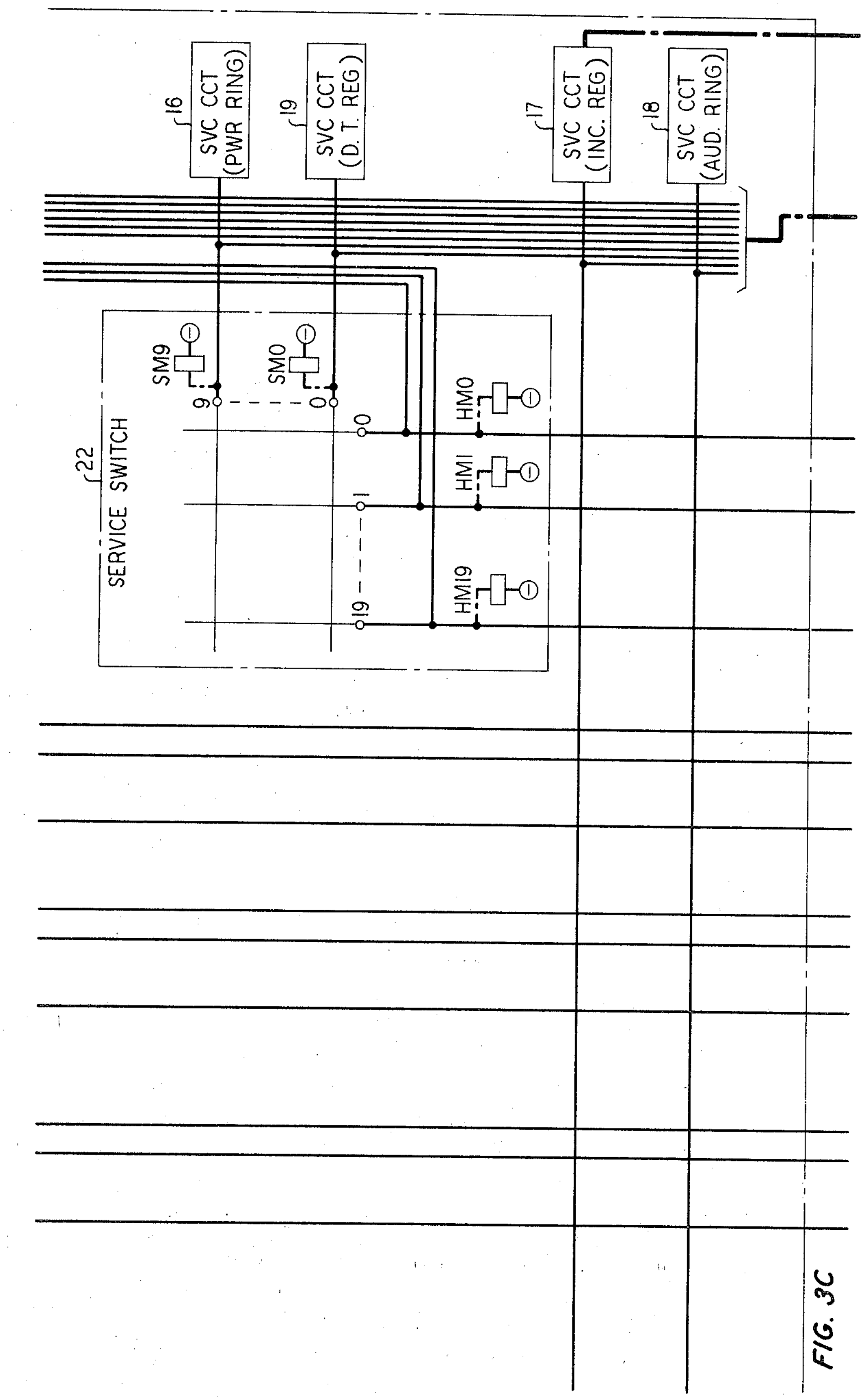

Prior to proceeding with the general description of the illustrative embodiment, it is believed that it will be beneficial to first more specifically describe the individual components of extended network 12 and their interrelationship. As shown in FIGS. 2 and 3, extended network 12 comprises a primary stage of switches consisting of 20 individual crossbar switches each having 20 vertical units and 11 horizontal units each controlled by individual magnets. In similar fashion, the secondary switching stage of extended network 12 consists of 20 crossbar switches each comprising 20 vertical units and 11 horizontal levels each controlled by individual magnets. The various incoming trunk circuits, such as incoming trunk circuit 15, outgoing trunk circuits (not shown), and intraoffice trunk circuits (not shown) are terminated on predetermined horizontal levels numbered 1 through 10 on each of the secondary switches.

Each of the horizontal levels 1 through 10 on the respective primary switches is distributed via D links as earlier noted through cables C10 and C11 to the trunk link frames in switching system 9 and the other modules equivalent to switching system 9. The horizontal levels designated 0 on each of the primary switches are connected to particular vertical units of service switch 21 thereby providing access to horizontal units 0 through 9 on service switch 21 upon which are terminated various service circuits, such as incoming registers and audible ringing tone circuits.

In similar fashion, horizontal levels 0 of each of the secondary switches are connected to specified vertical units of service switch 22 thereby providing access to the horizontal units designated 0 through 9 upon which are terminated other service circuits, such as power ringing circuits and dial tone register circuits.

Each of the primary switches are connected to E links which are distributed over the various secondary switches. Thus, for example, each of the verticals of primary switch 19 is connected via an E link to the respective 19th vertical of each of the secondary switches. By way of a more specific example, vertical unit 0 on primary switch 19 is connected via an E link to secondary switch 0 vertical 19. This pattern is repeated for all the links interconnecting the primary switch stage and the secondary switch stage so as to yield a total of 20 channels available for connecting an incoming trunk circuit, such as incoming trunk circuit 15 through secondary switch 19, via the primary switch stage and one of the D links to the appropriate trunk link frame and thence via the switching network of switching system 9 to an appropriate called station such as station S8 which terminates on line link frame 1 in switching system 9.

For purposes of facilitating the description, we shall assume that incoming trunk circuit 15 which leads to another central office (not shown) has been enabled. Thus in a manner well known in the art a linkage connection has been established from incoming trunk circuit 15 via horizontal 10 on secondary switch 19, via vertical 19 on secondary switch 19, via the associated E link through an enabled vertical unit 19 on primary switch 19, via enabled horizontal unit 0 on primary switch 19, through the associated service link to vertical unit 19 on service switch 21, and via enabled horizontal unit 0 on service switch 21 to service circuit 17. We shall further assume that service circuit 17 is in fact an incoming register circuit operable to receive a called directory number transmitted from the calling central office over incoming trunk circuit 15 and, further, that the called directory number has been received and registered in service circuit 17 and that this information has in turn been forwarded to called number registration circuit 501 in controller circuit 14. Called number registration circuit 501 symbolically represents any one of a number of configurations well known in the art operable to receive and to store a plurality of digits. Thus, at this point, in the processing of the instant connection, controller circuit 14 is informed of the called directory number of a called station. This information, along with the identity of the enabled trunk is transmitted to route translation circuit 503 which comprises any one of a number of configurations well known in the art operable to provide the called line equipment location information and routing information necessary to seek a network connection from incoming trunk circuit 15 through to a called station such as station S8 in switching system 9.

Deviating momentarily, it will be obvious from that which is contained hereinafter that an incoming connection to a called station is established by controller circuit 14 in two distinct stages. Initially, a service circuit (audible ringing tone) appearing on service switch 21 is connected via a linkage path extending through a primary switch and via an available E link to secondary switch 19 and thus to incoming trunk 15 in order to advise the calling station that the connection is in the process of being completed. Concurrently therewith, a service circuit (a power-ringing circuit) appearing on service switch 22 is connected via a linkage path extending through a secondary switch via an available E link to a primary switch and via an available D link through the network in switching system 9 to the called station to alert that station to the presence of an incoming call.

Upon an off-hook condition of station S8, the connections to the service circuits are released and replaced with a linkage connection extending from the primary switch stage to switch 19 in the secondary switch stage in order to provide a talking path.

Proceeding now with the description, as will be more apparent from that which is contained hereinafter, route translation circuit 503 provides information to controller circuit 14 as to the particular D links which should be given preference in attempting to establish a connection forward through switching system 9. As earlier noted, the particular D links selected will depend upon the distribution of these links over the various modules of trunk link frames which in turn is determined by the number of modules which are provided within a given central office.

We shall assume that a test is made of the D links and the E links to ascertain their availability and that it is determined that a D link is available to trunk link 5 from primary switch 1 and that the E link extending from primary switch 1 vertical 19 is available to interconnect with secondary switch 19 upon which the enabled trunk circuit 15 appears. It will be noted at this time that the selection of primary switch 1 for connection through to trunk link frame 5 of switching system 9 "fixes" the specific E link which ultimately will be used for the talking connection. This fact will be recognized because primary switch 1 has but one E link which provides access to secondary switch 19, namely the E link which is shown interconnecting vertical 19 of primary switch 1 and vertical 1 of secondary switch 19.

As will be apparent from that which is contained hereinafter, controller circuit 14 is arranged to initially establish the audible ringing tone connection which will extend from incoming trunk 15, via secondary switch 19, and one of the primary switches to a service circuit which we shall assume to be service circuit 18 which is terminated on horizontal 9 of service switch 21. Initially, control circuit 14 is arranged to attempt to utilize the now identified E link which will be subsequently used for the talking connection by employing it as part of the linkage path which extends through to service circuit 18. Thus, the initial connection established by control circuit 14 will be made via primary switch 1, if the balance of the linkage path extending to the required service circuit is available. If the entire path is not available, a connection is established to service circuit 18 via a similar linkage path not including primary switch 1 and thus not including the subject E link.

Upon establishing the aforesaid connection, controller circuit 14 is arranged to complete a linkage path from a power-ringing circuit such as service circuit 16 via horizontal 9 of service switch 22, vertical 19 of service switch 22 and via the service link which extends to horizontal 0 of secondary switch 19. The balance of the linkage connection will extend via vertical 1 of secondary switch 19 via the E link to vertical 19 of primary switch 1 and via an available horizontal level to trunk link 5 as earlier described. This latter connection takes place if all of the aforedescribed linkage path elements are, in fact, available and also if the E link just described has not been used in the previously described audible ringing tone connection. In the event either of these conditions are not met, a similar linkage path, not including the identified E link, nor the secondary switch (but including primary switch 1) will be enabled.

A condition may arise where even though the predetermined E link is available at this time, the service link which extends from secondary switch 19 to service switch 22 is presently unavailable. Under these conditions, as will be more apparent from that which is contained hereinafter, a connection will be established through primary switch 1 to trunk link frame 5 via a path extending from an available service circuit on service switch 22 through any available secondary switch appearance of a service link connection to service switch 22. Thus, for example, we may assume that this connection is completed via secondary switch 0. Accordingly, vertical 1 on secondary switch 0 is enabled and the E link which extends therefrom to vertical 0 of primary switch 1 is also enabled. In a manner which will be clear from that which is contained hereinafter, simultaneously with the enabling of vertical 0 of primary switch 1, vertical 19 is also enabled in primary switch 1 thus effectively connecting verticals 0 and 19 in multiple via the same horizontal level. As a result, in a manner well known in the art, the potentials present on the particular horizontal selected in primary switch 1 will be extended via enabled vertical 19 of that switch to the associated E link, thereby rendering it "busy" with respect to any succeeding busy tests conducted by controller circuit 14. It will also be noted that although vertical unit 1 in secondary switch 19 is also enabled in parallel with vertical unit 19 of primary switch 1, since we have assumed that a horizontal unit in secondary switch 19 is not enabled at this time, the aforesaid potentials are not extended any further than the E link itself.

It will thus be obvious from the foregoing, that controller circuit 14 is arranged to initially identify a linkage path which will eventually be utilized for a talking connection, and is further arranged to recognize the need for a particular link within that path and to thereupon (1) attempt to use the identified link as part of a linkage path extending from an audible ringing tone circuit to the enabled incoming trunk circuit; (2) in the alternative, to utilize the identified link as part of a linkage connection extending from a power ringing source to the called station, if in fact, it has not been utilized as set forth above; and (3) by way of a further alternation, to render the identified link unavailable for selection by activating it as part of a multiple connection in conjunction with the linkage path which is extended from the power ringing circuit to the called station.

Upon an off-hook condition of station S8 in response to the ringing applied thereto, the aforedescribed linkage paths involving the service circuits are released, thereby rendering the identified E link immediately available for use as the final link in the talking connection which extends from incoming trunk circuit 15 through extended network 12, and switching system 9 to station S8. It is, of course, obvious that the control circuitry may advantageously be arranged, as well known in the art, to maintain the linkage connection within switching system 9 enabled during the final establishment of the complete talking path.

DETAILED DESCRIPTION

For purpose of the detailed description, we shall assume that an incoming call via incoming trunk circuit 15 has proceeded in a manner set forth in the general description to the point where the called number has been registered in called number registration circuit 501. At this point, the called number information and the incoming trunk identity information is forwarded to route translator circuit 503. This latter circuit, in a manner well known in the art, is operable to translate the aforesaid information into the route selection data required by controller circuit 14 to establish the calling connection.

Accordingly, at this time, relays 5SL, 5B19, and 5BA19 are operated. It will be obvious from that which is contained hereinafter that relay 5SL operates since it will be necessary to test the SLO through SL19 conductors associated with service switch 21 in order to establish an audible ringing tone connection from a service circuit appearing on that switch through to the incoming trunk circuit appearance. An inspection of FIG. 4 will reveal that the enabled make contacts of the 5SL relay extends the aforesaid conductors associated with service switch 21 to test circuitry in controller circuit 14.

Simultaneously therewith, relay 5B19 also operates so as to extend the E links associated with secondary switch 19 via conductors B190 through B1919, through enabled make contacts on the 5B19 relay to test circuitry in controller circuit 14, the operation of which will also be described in detail in the following. Relay 5BA19, the function of which will be disclosed hereinafter, also operates at this time.

In addition to the foregoing, relay 5RO is also operated in similar fashion by route translation circuit 503. Relay 5R0, via its enabled make contacts extends conductors R00 through R019 from the correspondingly designated D links of FIG. 2 to the test circuitry of controller circuit 14.

Prior to proceeding with the detailed description, it will be noted that only a single conductor is shown terminated on the various horizontal and vertical units of the respective primary and secondary switches in extended network 12. It is intended that the single conductor shown constitutes the sleeve conductor of a three conductor linkage path which also comprises a tip lead and a ring lead. The configuration of the tip and ring leads is substantially identical in distribution to that shown for the sleeve leads. The three conductors thus comprise a linkage path which is used in the well-known manner for a talking connection.

Proceeding now with the description, in a manner well known in the art those sleeve leads which are engaged in existing talking connections will have ground potential placed thereon in conjunction with maintaining the supervision of such connections. It will be obvious that the relays designated 4CT0 through 4CT19 will be operated in accordance with the busy condition of sleeve leads extending through operated make contacts on the 5R0 relay or in the alternative from ground potential extending through enabled make contacts on the 5B19 relay from busy E links associated with the verticals of secondary switch 19. In similar fashion, the relays designated 4C1T0 through 4C1T19, also are operated in response to ground potential present on the SL0 through SL19 leads which are extended by enabled make contacts on the 5SL relay, or in the alternative by ground potential on any busy E links extending from the vertical units of secondary switch 19 through the aforedescribed path via enabled make contacts on the 5B19 relay.

It will thus be obvious that the idle or busy state of channels 0 through 19 will be reflected in the operated or released state of relays 4CT0 through 4CT19 and relays 4C1T0 through 4C1T19.

Sequence control circuit 601, which comprises any one of a number of configurations well known in the art operable to initiate control functions in sequence, now advances to operate relay 60P thus commencing channel selection. One of the channel designating relays 6E0 through 6E19 will be operated at this time depending upon the operated or released state of the respective 4CT0 through 4CT19 relays. We shall assume that horizontal 1 of primary switch 0 is presently engaged in another talking connection. Thus, ground present on the D link associated therewith will be extended via conductor R00 through enabled make contacts on relay 5R0 to cause the operation of relay 4CT0 at this time. We shall further assume that relay 4CT1 which, as earlier described, tests the idle or busy status of the D link associated with primary switch 1 is in a released state. Accordingly, ground is extended through enabled make contact 6OP-1, enabled transfer contact 4CTP-1, released transfer contact 4CT-1 and through the winding of relay 6E1 to thereby operate that relay at this time. As will be apparent from that which is contained hereinafter, the operation of relay 6E1 establishes the channel which will subsequently be used for the talking connection extending from the called line to incoming trunk circuit 15. With respect to extended network 12, it will be obvious that the aforesaid connections will extend through primary switch 1 and via horizontal 1 of that switch to trunk line frame 5 and thence to the called station in the well-known manner. It will also be noted that primary switch 1 has but one E link extending to secondary switch 19 upon which the incoming trunk circuit appears. This E link, which extends from vertical unit 19 on primary switch 1 to vertical 1 on secondary switch 19, is the link which must be available for the talking connection at a future point in the progress of the call.

As will be apparent from that which is contained hereinafter, an operated 6D- relay will control the particular linkage path now to be established in order to extend an audible ringing tone connection to incoming trunk circuit 15. Referring to FIG. 6, in view of the operation of relay 6E1, enabled transfer contacts 6E1-1 extends ground potential through released transfer contacts 4C1T1-1 to operate relay 6D1. Thus, the operation of 6D1 is preferred in view of the prior operation of relay 6E1 so as to thereby attempt to use the E link required for the talking connection at this time as part of the audible ringing tone connection. It will be obvious from an inspection of the operate paths of relays 6D0 through 6D19 that if relay 4C1T1 is operated at this time, that another 6D- relay will in fact operate thereby causing selection of another E link, rather than the one initially attempted to be reserved. For purpose of the immediate description, we shall assume that relay 6D1 has operated.

The following text will now describe the manner in which a linkage path is thus closed from incoming trunk circuit 15, via horizontal 10 of secondary switch 19, through vertical 1 of secondary switch 19, via the associated E link, through enabled vertical unit 19 on primary switch 1, through enabled horizontal 0 of primary switch 1, through enabled vertical unit 1 of service switch 21, and via enabled horizontal 9 of service switch 21 to audible ringing tone service circuit 18.

For the purpose of simplifying the following description, we shall assume that each of the crossbar switches comprise an individual select bar per select magnet and wherein the select magnets are arranged for fast operation relative to the operate speed of the hold magnet.

Proceeding now with the description, upon the completion of the selection of a linkage path as immediately hereinbefore described, sequence control circuit 601 advances so as to operate relay 6OPA to enable the selected linkage path. Thus, the enabling of make contacts 6OPA-6 extends ground to trunk and service circuit select magnet enabling circuit 502 at this time. This latter circuit may comprise any number of configurations well known in the art operable to translate a given trunk or service circuit identity into a circuit effective to operate the associated select magnet on the appropriate secondary switch in extended network 12. In this regard, it will be observed that route translation circuit 503 has registered therein the identity of the enabled incoming trunk circuit and the identity of an available audible ringing circuit. Thus, in a manner well known in the art, this information is converted by trunk and service circuit select magnet enabling circuit 502 into suitable ground potentials which are transmitted to cause the operation of select magnet 10 which is associated with incoming trunk circuit 15 on secondary switch 19, and concurrently therewith to extend ground potential to the sleeve lead associated with service circuit 18, thus completing the operate path of select magnet 9 in service switch 21 in extended network 12. Simultaneously with the enabling of the aforesaid select magnets, the enabled state of make contacts 6OPA-2 extends ground in FIG. 4 through enabled make contact 6D1-3, through enabled make contacts on the 5SL relay to the SL1 lead and thence to complete the obvious operate path of select magnet 0 on primary switch 1 and concurrently therewith to operate the obvious operate path of hold magnet HM1 on service switch 21. Ground is also extended via the enabled make contacts 6OPA-2 in FIG. 4 through enabled make contact 6D1-2, via enabled make contact on the 5B19 relay to lead B191 to extended network 12 to thereby simultaneously enable hold magnet HM1 on secondary switch 1 and hold magnet HM19 on primary switch 1.

Upon completion of the above-described circuit operation, a communication path extends from incoming trunk circuit 15 to service circuit 18 via enabled cross-points formed at the junctor of horizontal unit 10 and vertical unit 1 in secondary switch 19, via the associated E link through enabled cross-points formed at the intersection of enabled horizontal unit 0 and enabled vertical unit 19 of switch 1, via the associated service link, through an enabled cross-point formed at the intersection of enabled vertical unit 1 and enabled horizontal unit 9 of service switch 21 through to service circuit 18. Thus, at this point in the progress of the incoming call, audible ringing tone is returned to the calling station via incoming trunk circuit 15 to inform that station that the call is in the progress of completion to called station S8. After allowing a suitable predetermined interval, relay 60PA releases thereby allowing the existing connection to remain enabled under control of ground present on the sleeve lead extending from service circuit 18 through incoming trunk 15 in the well-known manner. It will be obvious from the foregoing, that if relay 6D1 had not in fact operated at this time that the operation of another 6D- relay would cause the completion of a different linkage path in a manner substantially identical to that described above.

Summarizing at this time, a linkage path has now been established from audible ringing service circuit 18 through to incoming trunk circuit 15 to advise the calling station that the connection is being completed through to the called station. It now remains but necessary to establish a power-ringing connection from a service circuit such as power-ringing service circuit 16 on service switch 22 via a linkage path extending through the secondary switches and the primary switches of extended network 12 and via an available D link through switching system 9 to called station S8. The previous operation of relay 6E1 has established the channel number ultimately to be used for the talking connection. In addition, it has also been thus established that the power-ringing connection will extend through primary switch 1.

Accordingly, sequence control circuit 601 now advances so as to cause the operation of relay 60PB at this time to thereby commence selection of a linkage path for the power-ringing connection as set forth hereinafter. The availability of the D link connected to horizontal 1 of primary switch 1 has already been ascertained in a manner hereinbefore set forth.

The enabled state of make contact 6E1-4 extends ground present on operated make contacts 6OPB-1 to cause the operation of relays 6A1 and 6SR. Referring now to FIG. 4, it will be noted that the operated state of the make contacts associated with relay 6A1 extends conductors A10 through A119 through to the correspondingly designated relays 5C2T0 through 5C2T19. Leads A10 through A119 are associated with the E links extending from primary switch 1. Thus, relay 5C2T0 through 5C2T19 are operated in response to ground potential on any of the aforesaid links thereby indicating the unavailability of such links at this time.

Referring to FIG. 5, the operated state of the make contacts of relay 6SR extends to SR0 through SR19 leads from service switch 22 through to the operate windings of relays 5C2T0 through 5C2T19. As shown on FIG. 3, the SR0 through SR19 conductors are each respectively associated with the vertical units of service switch 22. Thus, relays 5C2T0 through 5C2T19 will operate in response to ground present on any of the correspondingly designated SR0 through SR19 leads thereby indicating the unavailability of the vertical units associated therewith.

Thus, at this point in time, certain of the 5C2T0 through 5C2T19 relays will be in an operated state indicative of the unavailability of the associated E link or service link.

Referring now to FIG. 6, as will be apparent from that which is contained hereinafter, the particular linkage path which will be selected for the power-ringing connection is dependent upon which of 6C0 through 6C19 relays operate at this time. An examination of the operate paths of the 6C- relays will reveal that a preference chain extending through transfer contacts of the 5BA0 through 5BA19 relays give preference to the operation of a particular 6C relay at this time. As noted herein earlier, relay 5BA19 is in an operated state, thus, preference is given to the operation of relay 6C19 at this time, assuming the released state of relay 5C2T19. As will be apparent from that which is contained hereinafter, the operation of relay 6C19 would cause the selection of the E link which is to be associated ultimately with the talking connection extending to incoming trunk circuit 15. Thus, preference is given to the selection of that particular E link at this time. However, if that particular E link was used in the earlier described audible ringing tone connection, relay 5C2T19 will be in an operated state from ground present on the A119 conductor of FIG. 4 and thus, another one of the 6C0 through 6C18 relays will operate depending upon the availability of the associated linkage path to thereby cause selection of the corresponding E link and service link at this time.

Summarizing at this time, there are three possible conditions presently existing with respect to the E link required for the final talking connection:

1. The subject E link was previously used for the audible ringing tone connection. If this were true, relay 5C2T19 and one of the relays 6C0 through 6C18 will be in an operated state;

2. The subject E link has in fact been selected to be used for the present power-ringing connection. If this is true, relay 6C19 will be in an operated state; or 3. The subject E link was not used for the audible ringing tone connection and has not been selected for use in the power-ringing connection because of the unavailability of an associated service link. If this is true, one of the relays 6C0 through 6C18 is presently in an operated state.

We shall assume condition one, namely, that the E link required for the final talking connection was previously used for the audible ringing tone connection and further that as a result relay 6C0 is presently operated. The enabled state of make contacts 6OPT-2 and 6E1-7 in FIG. 4, extends ground through enabled make contacts of the operated 5R0 relay to the R01 lead which extends to horizontal 1 of primary switch 1, thus completing the obvious operate path of select magnet SM1 on that switch at this time.

Trunk and service circuit 502 is also enabled at this time, via operated make contact 6OPT-4, and in a manner well known in the art, extends ground to horizontal 9 of service switch 22 to cause operation of select magnet 9 which is associated with the present idle power-ringing service circuit 16.

Referring now to FIG. 5, ground is extended to the SR0 lead through enabled make contacts 6OPT-5 and 6CO-6 and through enabled make contacts of the previously operated 6SR relay, via the SR0 lead to operate hold magnet HM0 in service switch 22 thereby closing the cross-point at the intersection of vertical unit 0 and the previously enabled horizontal unit 9 which is associated with service circuit 16. This ground extended on the SR0 lead is further extended via the service link which extends from vertical 0 of service switch 22 to horizontal 0 of secondary switch 0 thereby completing the obvious operate path of select magnet SM0 in secondary switch 0.

Referring again to FIG. 5, ground is also extended via enabled make contacts 6OPT-8 and 6CO-8, through enabled make contacts on the 6A1 relay in FIG. 4, to the A10 lead thereby completing the obvious operate paths of hold magnet HM0 on primary switch 1 and hold magnet HM1 on secondary switch 0. In view of the previously described operation of select magnet SM0 on primary switch 1 and select magnet SM0 on secondary switch 0, cross-points are enabled on both switches to extend the associated tip, ring and sleeve leads from service circuit 16 through to station S8 via switching system 9. Thus, the power-ringing connection is completed and extends from service circuit 16 via horizontal 9 of service switch 22, enabled vertical unit 0 of service switch 22, via the service link associated therewith, via horizontal unit 0 on secondary switch 0, via enabled vertical unit 1 on secondary switch 0, via the E link associated therewith, through enabled vertical unit 0 on primary switch 1 and thence via horizontal level 1 and the associated D link to switching system 9 and through trunk link frame 5 and line link frame 1 to called station S8 in the well-known manner.

We shall now assume that condition two prevails rather than the aforedescribed condition one. Thus, at this point in time, relay 6C19 will be in an operated state. Accordingly, circuit operation proceeds in a manner substantially identical to that hereinbefore described with the exception that the power-ringing tone connection is completed via secondary switch 19 and primary switch 1. Thus, at this point in time, a power-ringing connection will extend from service circuit 16 via horizontal unit 9 in service switch 22, via enabled vertical unit 19 in service switch 22, through the service link associated therewith to horizontal 0 of secondary switch 19, via enabled vertical unit 1 of secondary switch 19, the E link associated therewith, enabled vertical unit 19 in primary switch 1, via enabled horizontal unit 1 of primary switch 1 to the associated D link and thence via trunk link frame 5 and line link frame 1 in switching system 9 to the called station in the well-known manner.

We shall now assume that conditions one and two do not prevail but rather that condition three does prevail, namely, that the subject E link was not used for the audible ringing tone connection and also has not been selected for use in the power-ringing connection. We shall further assume that relay 6CO is presently in an operated state. The operation of relay 6CO thereupon causes the completion of a linkage path extending from service circuit 16, via service switch 22, secondary switch 0 and via primary switch 1 in a manner identical to that above described for condition one. However, in addition to the aforesaid circuit action, the enabled state of make contact 5BA19–8 in FIG. 5, extends ground present on operated make contact 60PT–10, through enabled make contacts on the 6A1 relay to lead A119 and thus to extended network 12 and specifically to the E link required for the talking connection. Accordingly, this ground potential causes the operation of hold magnet HM19 in primary switch 1 and also causes the operation of hold magnet HM1 in secondary switch 19. It will thus be obvious from the foregoing that at this point in time, two hold magnets will operate in primary switch 1, namely, hold magnet HMO and hold magnet HM19. In view of the previously described enabled state of select magnet SM1 which is associated with horizontal 1 of primary switch 1, cross-points associated with vertical unit 0 and vertical unit 19 will be enabled on level 1 of primary switch 1 thereby effectively connecting both vertical units in multiple. The effect of the foregoing is to impress upon the E link required for the talking connection all potentials present on the parallel path extending to vertical O of primary switch 1. Accordingly, during the power-ringing connection, ground will be present on the sleeve lead of the subject E link thus rendering it unavailable for subsequent selection because of its apparent "busy" state. It is also to be noted that although hold magnet HM1 operates in secondary switch 19, no cross-points will close in vertical 1 of that switch since there are presently no select magnets in an operated state at this time on secondary switch 19.

It is apparent from the foregoing that irrespective of which of the three possible conditions prevail, the control circuitry is arranged to ensure the future availability of the E link required for the talking connection; first by giving it preference for use in both the audible ringing tone connection and the power-ringing connection and in the alternative, to reserve it for future use by multiple operation of hold magnets on the associate primary switch.

Accordingly, upon an off-hook condition of station S8, in a manner well known in the art, ground is removed from the sleeve lead of the existing connections thus releasing the linkage paths which extend through network 12. Controller circuit 14 may thereupon immediately enable a voice path extending through horizontal 1 of primay switch 1 via the E link connecting to secondary switch 19 and thence to incoming trunk circuit 15. In view of the earlier described circuit operation of controller circuit 14 in establishing the initially required connections, the availability of the required E link between secondary switch 19 and primary switch 1 is assured.

Although the embodiment of my invention discloses an electromechanical controller circuit operable to ensure the subsequent availability of a single link extending between succeeding stages of a crossbar switching network, it is obvious that numerous other arrangements may be devised by those skilled in the art without departing from the spirit and scope of my invention.

For example, the instant invention may be embodied in an electronically controlled or electromechanically controlled switching network wherein it is required that a linkage path comprising a plurality of individual links require reservation for subsequent use.

What is claimed is:

1. In a switching system,
a switching network comprising a plurality of connectable switching elements and a plurality of terminals,
means for establishing a first set of exclusive connections between certain said terminals via certain said network elements,
means for identifying certain other elements to be employed in establishing another connection between two of said certain terminals after release of said first set of connections, and
control means activated by said identifying means for selectively using said other elements in said first set of connections and said another connection.

2. In a telephone system,
a station,
a trunk,
a switching network comprising a plurality of connectable switching elements,
means for establishing independent signaling connections to said station and to said trunk via certain said network elements,
means for identifying certain other elements to be employed in establishing a voice communication path between said station and said trunk after release of said signaling connections, and
control means activated by said identifying means for selectively using said other elements in said signaling connections and said voice path.

3. In a telephone system,
a switching network comprising a plurality of linkage paths,
means for successively selecting a plurality of said linkage paths,
means for identifying a subsequent linkage path after selecting an initial linkage path, and
means activated by said identifying means for simultaneously making busy both said initial and subsequent linkage paths.

4. In a telephone system,
a switching network comprising a plurality of switching stages,
a plurality of links each exclusively operable for interconnecting certain of said stages,
means for successively establishing a plurality of connections to one of said stages,
means for identifying the link required for a subsequent one of said connections after selecting a link for an initial one of said connections, and means activated by said identifying means for simultaneously connecting the said link selected for said initial connection and the said link required for said subsequent connection together in said one of said stages.

5. In a telephone system, the combination set forth in claim 4 wherein said switching stages comprise a plurality of serially related crossbar switches.

6. In a telephone system, the combination set forth in claim 5 further comprising means for releasing said enabled links and for reselecting only the said link required for said subsequent connection.

7. In a telephone system, a switching network comprising a plurality of stages, an incoming trunk connected to a first stage, a ringing circuit connected to a second stage, an audible tone circuit connected to a third stage, a called station connected to a fourth stage, a plurality of links each exclusively operable for interconnecting two of said stages, means responsive to the activation of said incoming trunk for enabling the link between said first stage and said third stage, means for enabling the link between said second stage and said fourth stage, means for partially enabling the link between said first stage and said fourth stage, and means responsive to a predetermined signal from said called station for releasing said links and for reenabling only the said link between said first stage and said fourth stage.

8. In a telephone system, a switching network comprising a plurality of serially relates stages, each stage connected to another stage by an exclusive link, means for successively establishing a plurality of connections to one of said stages via an available one of said links, and means operative during the establishment of an initial said connection for ensuring the availability of a unique link required for a subsequent connection comprising means for identifying said unique link, means for attempting to utilize said unique link in said initial connection, and means operable upon said unique link not being used in said initial connection for simultaneously enabling the said available link employed for said initial connection and the said unique link required for said subsequent connection.

9. In a telephone system, a switching network comprising a plurality of serially related stages, each stage connected to another stage by an exclusive link, means for successively establishing a first connection and a second connection to one of said stages, and means operative during the establishment of said first connection for ensuring the availability of a unique link required for said second connection comprising means for identifying said unique link, and means for simultaneously enabling the said exclusive link required for said first connection and the said unique link required for said second connection.

10. In a telephone system, a switching network comprising a plurality of alternative linkage paths each comprising a plurality of elements, means for successively selecting a plurality of said linkage paths, and means operative during the selection of an initial one of said linkage paths for ensuring the availability of a subsequent linkage path comprising means for identifying the elements of said subsequent linkage path, means for attempting to utilize said identified elements in said initially selected linkage path, and means operable upon the unavailability for use in said initial linkage path of any of said identified elements for simultaneously enabling said initial linkage path and any said unavailable element of said subsequent linkage path.

11. In a telephone system, a switching network comprising a plurality of switching stages, an exclusive link interconnecting any two of said stages, wherein a requested calling connection between an incoming trunk and a called station has audible and power ringing circuits respectively connected over separate network paths to the trunk and station prior to the establishment of a talking path between said trunk and said station, and circuitry is provided for ensuring the availability of a unique link required for said talking path, the improvement comprising means activated by said trunk for registering the number of said called station, means responsive to said registering means for identifying said unique link for said talking path, means responsive to said identifying means for attempting to selectively use said unique link in said power-ringing circuit network path and said audible ringing circuit network path, and means operable upon said unique link not being selectively sued in said power-ringing circuit network path and said audible ringing circuit network path for selecting said power-ringing circuit network path as to pass through one of said switching stages common with said unique link, said selecting means marking said unique link unavailable for use by interconnecting said power-ringing circuit network path and said unique link.

* * * * *